United States Patent

Tsuji et al.

[11] Patent Number: 5,803,614
[45] Date of Patent: Sep. 8, 1998

[54] BEARING STRUCTURE OF SLIDING BEARING

[75] Inventors: Hideo Tsuji; Hideo Ishikawa; Motomu Wada; Takayuki Shibayama, all of Nagoya, Japan

[73] Assignee: Daido Metal Company, Ltd., Nagoya, Japan

[21] Appl. No.: 870,828

[22] Filed: Jun. 6, 1997

[51] Int. Cl.[6] ............................. F16C 9/02; F16C 33/02
[52] U.S. Cl. ............................. 384/276; 384/912
[58] Field of Search .................... 384/276, 294, 384/912, 913, 288

[56] References Cited

U.S. PATENT DOCUMENTS

| | | | |
|---|---|---|---|
| 4,562,122 | 12/1985 | Hodes et al. | 384/276 X |
| 4,836,695 | 6/1989 | Baureis et al. | 384/276 |
| 5,116,692 | 5/1992 | Morie et al. | 428/650 |
| 5,137,792 | 8/1992 | Hodes et al. | 384/912 X |
| 5,185,216 | 2/1993 | Tanaka et al. | 384/912 X |
| 5,589,012 | 12/1996 | Hobby et al. | 384/912 X |

FOREIGN PATENT DOCUMENTS

| | | |
|---|---|---|
| 61-88020 | 5/1986 | Japan . |
| 289813 | 3/1990 | Japan . |
| 2243418 | 10/1991 | United Kingdom . |
| 2270721 | 3/1994 | United Kingdom . |

*Primary Examiner*—Thomas R. Hannon
*Attorney, Agent, or Firm*—Browdy and Neimark

[57] ABSTRACT

There is disclosed a bearing structure having an excellent fretting resistance. In the bearing structure in which a sliding bearing is mounted at its back face on a housing, and rotatably supports a rotation shaft at an inner face thereof, and a covering layer of an amorphous alloy is formed on at least one of the back face of the sliding bearing and an inner surface of the housing. Thanks to an excellent non-adhesion property of the amorphous alloy, adhesion is less liable to develop between the back face of the bearing and the housing even if a slight friction repeatedly occurs therebetween, thereby imparting an excellent fretting resistance to the bearing structure.

6 Claims, 1 Drawing Sheet

BEARING STRUCTURE OF SLIDING BEARING

BACKGROUND OF THE INVENTION

This invention relates generally to a bearing structure of a sliding bearing, and more particularly to a bearing structure of a sliding bearing subjected to dynamic loads of an internal combustion engine or the like.

Recently, for the purpose of achieving a lightweight design, a housing, on which a sliding bearing is mounted, has been reduced in thickness, or has been made of an aluminum alloy, and therefore the housing has been reduced in rigidity. As a result, slight, repeated strains due to dynamic loads are more liable to develop in the housing than in housings of the earlier type. For example, a big end portion of a connecting rod and a main bearing portion in an internal combustion engine have been formed into a lightweight design so as to achieve a high-speed, high-temperature and high-load design. Because of slight repeated strains of the housing, a relative slight impingement and a relative slight slip develop at a back face of a sliding bearing which is mounted on the big end portion and the main bearing portion, so that the sliding bearing is liable to be damaged by fretting wear.

To deal with this fretting wear, there have heretofore been proposed a structure in which a coating of phosphate having an excellent fretting resistance is formed on the back face of the sliding bearing, another structure in which a covering layer of a resin (e.g. PTFE) having excellent lubricating properties is formed on the back face of the sliding bearing, and still another structure in which a covering layer of silver or copper is formed by plating on the back face of the sliding bearing.

JP-A-61-88020 discloses a structure in which a covering layer, made of copper, nickel, aluminum, or an alloy thereof, and having the hardness of Hv 15 to 80, is formed on a back face of a bearing. These soft metals covering layer suppress fretting wear.

JP-A-2-89813 discloses a structure in which PTFE is precipitated in a plated layer of Ni or Co simultaneously with the formation of this plated layer, thereby forming a composite plated layer serving as a covering layer. The reason for this is that since PTFE having a low friction coefficient is inferior in bonding strength to a back metal, PTFE cooperates with Ni or Co to form the composite plated layer, thereby enhancing the bonding strength. This publication discloses that by thus enhancing the close contact of the back face of the bearing with the housing, there can be provided a bearing having the enhanced fretting resistance.

With respect to the soft covering layer (disclosed in JP-A-61-88020) composed of the metal having the hardness of Hv 15 to 80, because of its inadequate rigidity, an adhesion phenomenon is liable to occur between the back face of the bearing and the housing, and fretting resulting therefrom is liable to occur. Thus, the sufficient fretting resistance could not be obtained merely by using the soft covering layer.

The covering layer (disclosed in JP-A-2-89813) composed of PTFE and metal such as Ni, is also intended to enhance the close contact between the back face of the bearing and the housing so as to enhance the fretting resistance. However, adhesion occurs between the back face of the bearing and the housing because of a slight friction still developing therebetween, so that the fretting resistance could not be enhanced satisfactorily.

Thus, the above conventional covering layers are not satisfactory in fretting resistance.

SUMMARY OF THE INVENTION

The present invention has been made based on an excellent non-adhesion property of an amorphous alloy, and an object of the invention is to provide a bearing structure in which adhesion is less liable to develop between a back face of a bearing and a housing even if a slight sliding friction repeatedly occurs therebetween, thereby imparting an excellent fretting resistance to the bearing structure.

According to the present invention, there is provided a bearing structure comprising a housing, a sliding bearing which is mounted at its back face on the housing and which rotatably supports a rotation shaft on an inner face thereof, and a covering layer of an amorphous alloy is formed on at least one of the back face of the sliding bearing and an inner surface of the housing.

The housing may be made of a steel formed by forging or by a sintered alloy, a light alloy such as an aluminum alloy, or any other suitable material.

The sliding bearing may comprise a composite bearing such as a two-layer bearing having a bearing metal layer formed on a back metal, or a three-layer bearing having a bearing metal layer formed on a back metal, and an overlay layer formed on the bearing metal layer. An aluminum-based alloy or a copper-based alloy may be used as a bearing metal.

Usually, a cold rolled, soft steel sheet may be used as the back metal, but any other suitable material such as aluminum can be used as the back metal.

The covering layer may be formed on either of the back face of the sliding bearing and the inner surface of the housing, or may be formed on both of the back face of the sliding bearing and the inner surface of the housing.

The covering layer of the amorphous alloy may be formed by a bonding method (by which a thin film of the amorphous alloy is bonded), a sputtering method, or a vapor deposition method, but the formation of the covering layer by a plating method is the easiest, and therefore is most preferred. With respect to the plating method, an electric deposition (precipitation) method and an electroless plating method are suitably used depending on the kind of the amorphous alloy.

The amorphous alloy may comprise a binary alloy, a ternary alloy, or an alloy composed of more than three principal metallic components, and a suitable alloy is selected depending on the hardness of the back metal and the housing. Examples of such binary alloy include a Ni alloy such as Ni—P, Ni—B, Ni—H, Ni—W, Ni—S, Ni—Zn and Ni—Mo, a Co alloy such as Co—P, Co—B, Co—H, Co—W, Co—S, Co—Zn and Co—Mo, and a Cr alloy such as Cr—H and Cr—C. These binary alloys are liable to be formed into an amorphous structure, and therefore are preferred.

Examples of such ternary alloy include a Ni-alloy such as Ni—Co—P, Ni—Co—B, Ni—Fe—P, Ni—W—P, Ni—W—B, Ni—Mo—P, Ni—Mo—B, Ni—Cu—P, Ni—Cr—P, a Co alloy such as Co—W—B, Co—Ni—P and Co—Zn—P, and a Cr alloy such as Cr—W—H, Cr—Mo—H and Cr—Fe—H.

The content of the alloy element of the amorphous alloy need only to be such that the covering layer in the amorphous state can be formed. For example, in the case of forming a covering layer, composed of an amorphous alloy of Ni—P, by a plating method, the amorphism rate abruptly increases as the P content increases to about 5 wt. %, and with the P content of about 8 wt. %, the covering layer becomes amorphous almost completely. Therefore, when forming the covering layer, composed of the amorphous alloy of Ni—P, by the plating method, the content of P (alloy element) is preferably not less than 5%, and more preferably not less than about 8%.

The thickness of the covering layer can be suitably selected, but if this thickness is too small, the durability of the covering layer is not satisfactory. Thermal conductivity of the amorphous alloy is not good, and the thick covering layer lowers a cooling efficiency of the bearing. Therefore, preferably, the thickness of the covering layer, formed on either of the inner surface of the housing and the back face of the back metal, or the sum of the thicknesses of the covering layers, formed respectively on the inner surface of the housing and the back face of the back metal, is about 2 μm to about 30 μm.

As described above, in the invention as defined in claim 1, the covering layer of the amorphous alloy is formed on at least one of the back face of the sliding bearing and the inner surface of the housing, and with this construction, there can be provided a bearing structure of the sliding bearing in which the high fretting resistance and wear resistance of the back face of the bearing are ensured.

DESCRIPTION OF THE PREFERRED EMBODIMENTS

The present invention will now be described by way of Examples.

Figure 1:
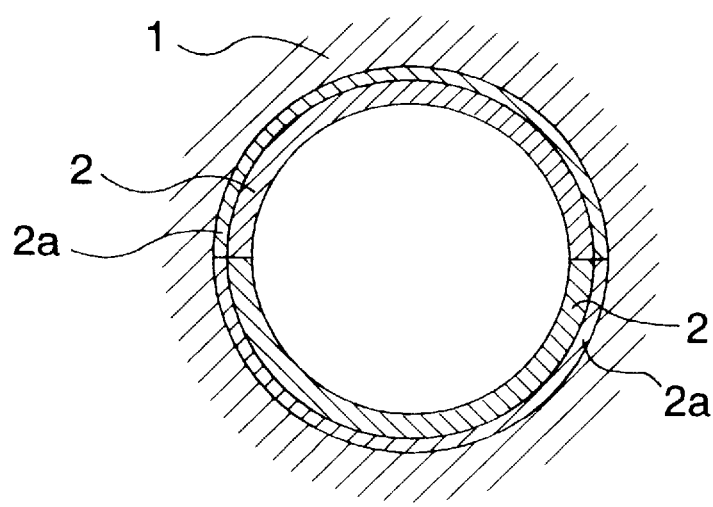
FIG. 1 is a sectional view showing a bearing structure embodying the present invention.
Figure 2:
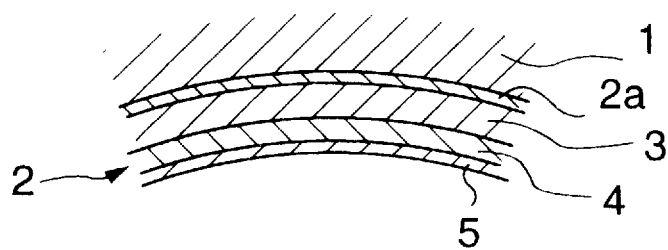
FIG. 2 is a partial sectional view of a main portion of the bearing structure of FIG. 1.

As shown in FIGS. 1 and 2, each of sliding bearing structures, used in a test, was designed so that a sliding bearing 2 was mounted at its back face on an big end portion (housing 1) of a connecting rod of an engine for an automobile, so as to rotatably support a crankshaft on its inner face. The sliding bearing 2 was a half bearing of a semi-cylindrical shape, and a cold rolled sheet (JIS G3141 SPCC) was used as a back metal 3. A bearing alloy layer 4, consisting of the balance Cu, 3.5% Sn and 23% Pb by weight, was formed by sintering on the back metal, the bearing alloy layer 4 having a thickness of 0.3 mm.

Then, this composite bimetal was cut into a piece of a predetermined length, and these pieces were curved into a semi-cylindrical shape, thereby preparing a half bearing 2 having an inner diameter of 42 mm, an outer diameter of 45 mm and a width of 17 mm. Further, an overlay 5, consisting of the balance Pb, 10% Sn and 3% Cu by weight was formed by plating on the bearing alloy layer of this half bearing, the overlay having a thickness of 15 μm.

Further, each of covering layers 2a, shown respectively in Examples and Comparative Examples in Table 1, was formed by plating on the back face 2 of the back metal of the bearing, each covering layer having a thickness of 10 μm. With respect to Comparative Example 1, the covering layer was not formed.

Regarding each of the covering layers, the crystal structure thereof was examined by use of X ray diffraction, with the result that it was confirmed that in each of comparative examples Nos. 2 to 8 the X ray diffraction graph had a sharp peak intensity which means a crystalline structure, and that in each of examples Nos. 1 to 10 of the present invention the X ray diffraction graph had a broad peak intensity which means an amorphous structure.

TABLE 1

| | | Plating conditions | | | Composition |
|---|---|---|---|---|---|
| | | Bath composition | (g/L) | Bath temperature (°C.) | of covering layer |
| Example of the invention | 1 | Nickel sulfate | 30 | 95~98 | Amorphous Ni—5% P |
| | 2 | Sodium hypophosphite | 5~15 | | Amorphous Ni—10% P |
| | | Sodium citrate | 10 | | |
| | 3 | Ammonium chloride | 10 | | Amorphous Ni—15% P |
| | 4 | Nickel sulfate | 30 | 45~55 | Amorphous Ni—12% B |
| | 5 | Sodium tartrate | 40 | | Amorphous Ni—16% B |
| | 6 | Sodium borohydride | 10~15 | | Amorphous Ni—20% B |
| | 7 | Nickel chloride | 48 | 25~35 | Amorphous Ni—20% S |
| | | Ammonium chloride | 40 | | |
| | 8 | Sodium thiosulfate | 180~250 | | Amorphous Ni—30% S |
| | 9 | Chromic acid | 200 | 55~65 | Amorphous Cr—20% H |
| | | Ammonium sulfate | 5 | | |
| | | Ammonium citrate | 300 | | |
| | 10 | Cobalt sulfate | 30 | 95~98 | Amorphous Co—10% P |
| | | Sodium hypophosphite | 10 | | |
| | | Sodium citrate | 10 | | |
| | | Ammonium sulfate | 5 | | |
| Comparative Example | 1 | — | | | No covering layer |
| | 2 | Cu plating in cyan bath | | | Crystalline Cu |
| | 3 | Alkali Sn plating | | | Crystalline Sn |
| | 4 | Ni plating in watt bath | | | Crystalline Ni |
| | 5 | Nickel sulfate | 30 | 95~98 | Crystalline Ni—2% P |
| | | Sodium hypophosphite | 4 | | |

TABLE 1-continued

|   | Bath composition | | (g/L) | Plating conditions Bath temperature (°C.) | Composition of covering layer |
|---|---|---|---|---|---|
| 6 | Sodium citrate | | 10 | 45~55 | Crystalline Ni—4% B |
|   | Ammonium chloride | | 10 | | |
|   | Nickel sulfate | | 30 | | |
|   | Sodium tartrate | | 40 | | |
|   | Sodium borohydride | | 5 | | |
| 7 | Nickel chloride 48 | Sodium thio-sulfate | 120 | 25~35 | Crystalline Ni—8% S |
| 8 | Ammonium chloride 40 | sodium thio-sulfate | 350 | | Crystalline Ni—50% S |

Electroplating was used in Examples 7, 8 and 9 and Comparative Examples 2, 3, 4, 7 and 8, and electroless plating was used in Examples 1 to 6 and 10 and Comparative Examples 5 and 6.

A fretting test for each of the thus obtained Examples and Comparative Examples was carried out by a vibration testing machine under conditions shown in Table 2. Whether or not any damage due to fretting was present was judged with the naked eyes.

TABLE 2

| Test conditions | | Unit |
|---|---|---|
| Dimensions of bearing | 45 (outer diameter) × 17 (width) × 1.5 (thickness) | mm |
| Frequency | 60 | Hz |
| Number of cycles | 2 × 10⁶ | cycle |
| Material of connecting rod | Forged product | — |
| Material of shaft | JIS S55C | — |

As a result, as shown in Table 3, damage due to the fretting was observed with respect to Comparative Examples 1 to 8. Particularly, Comparative Example 1 with no covering layer was damaged markedly. On the other hand, no damage due to the fretting was seen in Examples 1 to 10.

TABLE 3

| | | Kind of covering layer | Fretting |
|---|---|---|---|
| Example of the invention | 1 | Ni-5%P (Amorphous) | None |
| | 2 | Ni-10%P (Amorphous) | None |
| | 3 | Ni-15%P (Amorphous) | None |
| | 4 | Ni-12%B (Amorphous) | None |
| | 5 | Ni-16%B (Amorphous) | None |
| | 6 | Ni-20%B (Amorphous) | None |
| | 7 | Ni-20%S (Amorphous) | None |
| | 8 | Ni-30%S (Amorphous) | None |
| | 9 | Cr-20%H Amorphous) | None |
| | 10 | Co-10%P (Amorphous) | None |
| Comparative Example | 1 | No covering layer | Occurred |
| | 2 | Cu (Crystalline) | Occurred |
| | 3 | Sn (Crystalline) | Occurred |
| | 4 | Ni (Crystalline) | Occurred |
| | 5 | Ni-2%P (Crystalline) | Occurred |
| | 6 | Ni-4%B (Crystalline) | Occurred |
| | 7 | Ni-8%S (Crystalline) | Occurred |
| | 8 | Ni-50%S (Crystalline) | Occurred |

What is claimed is:

1. A bearing structure comprising a housing, a sliding bearing which is mounted at its back face on said housing and which rotatably supports a rotation shaft on an inner face thereof, and a covering layer of an amorphous alloy formed on at least one of the back face of said sliding bearing and an inner surface of said housing.

2. A bearing structure according to claim 1, said sliding bearing being one selected from the group consisting of two-layer sliding bearings each having a back metal and a bearing metal layer bonded on the back metal, and three-layer sliding bearing each having a back metal, a bearing metal layer bonded on the back metal, and an overlay bonded on the bearing metal layer.

3. A bearing structure according to claim 1, said bearing layer being made of one selected from the group consisting of aluminum-based alloys and copper-based alloys.

4. A bearing structure according to claim 1, said covering layer being made of at least one selected from the group consisting of binary Ni-based alloys, binary Co-based alloys, binary Cr-based alloys, ternary Ni-based alloys, ternary Co-based alloy, and ternary Cr-based alloys.

5. A bearing structure according to claim 4, said binary Ni-based alloy being one selected from the group consisting of Ni—P, Ni—B, Ni—H, Ni—W, Ni—S, Ni—Zn, and Ni—Mo, said binary Co-based alloy being one selected from the group consisting of Co—P, Co—B, Co—H, Co—W, Co—S, Co—Zn, and Co—Mo, said binary Cr-based alloy being one selected from the group consisting of Cr—H, and Cr—C, said ternary Ni-based alloy being one selected from the group consisting of Ni—Co—P, Ni—Co—B, Ni—Fe—P, Ni—W—P, Ni—W—B, Ni—Mo—P, NiMo—B, Ni—Cu—P, and Ni—Cr—P, said ternary Co-based alloy being one selected from the group consisting of Co—W—B, CoNi—P, and Co—Zn—P, said ternary Cr-based alloy being one selected from the group consisting of Cr—W—H, Cr—Mo—H, and Cr—Fe—H.

6. A bearing structure according to claim 1, said covering layer having a thickness of 2 to 30 μm in total.

* * * * *

UNITED STATES PATENT AND TRADEMARK OFFICE
CERTIFICATE OF CORRECTION

PATENT NO. : 5,803,614
DATED : September 8, 1998
INVENTOR(S) : Hideo Tsuji, et. al.

It is certified that error appears in the above-identified patent and that said Letters Patent is hereby corrected as shown below:

Title page, item [30], Foreign Application Priority Data add--
July 15, 1996   [JP]   Japan   08-205312--

Signed and Sealed this

Seventh Day of March, 2000

Attest:

Attesting Officer

Q. TODD DICKINSON

Commissioner of Patents and Trademarks